(12) United States Patent
Lee et al.

(10) Patent No.: US 10,333,127 B2
(45) Date of Patent: Jun. 25, 2019

(54) RECHARGEABLE BATTERY MODULE

(71) Applicant: SAMSUNG SDI CO., LTD., Yongin-si, Gyeonggi-do (KR)

(72) Inventors: Hyun-Soo Lee, Yongin-si (KR); Jeong-Won Oh, Yongin-si (KR); Sang-Shin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 57 days.

(21) Appl. No.: 14/981,566

(22) Filed: Dec. 28, 2015

(65) Prior Publication Data
US 2016/0372731 A1    Dec. 22, 2016

(30) Foreign Application Priority Data
Jun. 19, 2015   (KR) .................. 10-2015-0087579

(51) Int. Cl.
*H01M 10/613* (2014.01)
*H01M 10/617* (2014.01)
(Continued)

(52) U.S. Cl.
CPC ............ *H01M 2/18* (2013.01); *H01M 2/024* (2013.01); *H01M 2/043* (2013.01); *H01M 2/1077* (2013.01); *H01M 10/613* (2015.04); *H01M 10/617* (2015.04); *H01M 10/647* (2015.04); *H01M 10/6562* (2015.04);
(Continued)

(58) Field of Classification Search
CPC ........ H01M 2/18; H01M 2/024; H01M 2/043; H01M 2/1077; H01M 10/0413; H01M 10/0468; H01M 10/613; H01M 10/623; H01M 10/647; H01M 10/655;
(Continued)

(56) References Cited

U.S. PATENT DOCUMENTS 7,507,124 B2    3/2009    Kim

FOREIGN PATENT DOCUMENTS

JP    2005-108747 A    4/2005
JP    3725433 B2    12/2005
(Continued)

OTHER PUBLICATIONS

JPlatPat Machine Translation of the detailed description of JP 2005-107474A (Apr. 2005).*
(Continued)

*Primary Examiner* — Gregg Cantelmo
(74) *Attorney, Agent, or Firm* — Lewis Roca Rothgerber Christie LLP

(57) ABSTRACT

A rechargeable battery module includes: a plurality of unit cells, wherein each of the unit cells comprises: an electrode assembly having a plate shape; a case receiving the electrode assembly and having an opening at one side; and a cap assembly sealing the opening of the case, wherein the case comprises a first buffer unit configured to reduce a force generated inside or outside the case on an inner surface and an outer surface of a bottom of the case, the cap assembly comprises a second buffer unit configured to reduce a force generated inside or outside the case on an inner surface and an outer surface of the cap assembly, and the first buffer unit of each unit cell partially overlaps the first buffer unit of a neighboring unit cell.

14 Claims, 6 Drawing Sheets

(51) Int. Cl.
  *H01M 10/647* (2014.01)
  *H01M 10/6562* (2014.01)
  *H01M 2/02* (2006.01)
  *H01M 2/04* (2006.01)
  *H01M 2/10* (2006.01)
  *H01M 2/18* (2006.01)
  *H01M 10/04* (2006.01)

(52) U.S. Cl.
  CPC .... *H01M 10/0413* (2013.01); *H01M 10/0468* (2013.01); *H01M 2220/20* (2013.01)

(58) Field of Classification Search
  CPC ......... H01M 10/6552; H01M 2220/20; H01M 10/617; H01M 10/6562
  See application file for complete search history.

(56) References Cited

FOREIGN PATENT DOCUMENTS

| | | |
|---|---|---|
| JP | 2006-331874 A | 12/2006 |
| JP | 2007-103344 A | 4/2007 |
| KR | 10-0684796 B1 | 2/2007 |

OTHER PUBLICATIONS

EPO Extended Search Report dated Nov. 7, 2016, for corresponding European Patent Application No. 16167481.7 (9 pages).
Japanese Patent Abstract for JP 2002245975 A, which corresponds to JP Publication No. 3725433 B2, published Dec. 14, 2005, 1 page and Machine English Translation, 16 pages.

\* cited by examiner

RECHARGEABLE BATTERY MODULE

CROSS-REFERENCE TO RELATED APPLICATION

This application claims priority to and the benefit of Korean Patent Application No. 10-2015-0087579, filed in the Korean Intellectual Property Office on Jun. 19, 2015, the entire content of which is incorporated herein by reference.

BACKGROUND

1. Field

Aspects of embodiments of the present invention relate generally to a rechargeable battery module.

2. Description of the Related Art

A rechargeable battery can be repeatedly charged and discharged, unlike a primary battery that is typically not recharged, and is used in various high-tech fields. For example, rechargeable batteries of a low capacity may be utilized for small portable electronic devices such as mobile phones, laptop computers, and camcorders, and large capacity rechargeable batteries may be utilized as a power source for driving a motor of a hybrid vehicle, etc.

Recently, high power rechargeable batteries utilizing a non-aqueous electrolyte and having high energy density have been developed, and the high power rechargeable batteries are coupled in series to be utilized in equipment requiring power storage or a high amount of electric power, thereby forming a high power large capacity battery module.

Meanwhile, to increase the capacity of the battery in the large capacity rechargeable battery of the above battery module configuration, a thickness thereof has a trend to be gradually thinning. However, in this case, mechanical rigidity of the battery case may be low such that the battery case may be easily deformed by a relatively weak external impact, thereby deteriorating stability of the battery module.

Also, in the process in which the rechargeable battery utilizing the non-aqueous electrolyte repeats the charge and discharge, an inner temperature of the electrode assembly may increase, which may result in the electrolyte solution in the assembly decomposing, a combustible gas being generated such that a swelling phenomenon in which the battery case is swelled is generated, and interface resistance of the electrode body increasing such that the performance of the rechargeable battery is deteriorated.

The above information disclosed in this Background section is only for enhancement of understanding of the background of the described technology and therefore it may contain information that does not constitute prior art.

SUMMARY

Aspects of embodiments of the present invention relate to a rechargeable battery module having a structure in which excessive expansion of a case due to swelling may be reduced, even if the rechargeable battery is used for a relatively long period of time, and the rechargeable battery is protected even if an external impact is transmitted to the case receiving the electrode assembly.

According to some embodiments of the present invention, a rechargeable battery module includes: a plurality of unit cells, wherein each of the unit cells comprises: an electrode assembly having a plate shape; a case receiving the electrode assembly and having an opening at one side; and a cap assembly sealing the opening of the case, wherein the case comprises a first buffer unit configured to reduce a force generated inside or outside the case on an inner surface and an outer surface of a bottom of the case, the cap assembly comprises a second buffer unit configured to reduce a force generated inside or outside the case on an inner surface and an outer surface of the cap assembly, and the first buffer unit of each unit cell partially overlaps the first buffer unit of a neighboring unit cell.

According to some embodiments, for each unit cell, the first buffer unit and the second buffer unit comprise a depression portion at the inner surface and the outer surface, respectively.

According to some embodiments, the depression portions at the outer surface and the inner surface form an air passage.

According to some embodiments, for each unit cell, the depression portion at the outer surface of the bottom surface of the case partially overlaps the depression portion at the outer surface of a cap assembly of the neighboring unit cell.

According to some embodiments, for each unit cell, the depression portion at the inner surface of the bottom surface of the case alternates with the depression portion at the inner surface of a cap assembly of the neighboring unit cell without overlapping.

According to some embodiments, for each unit cell, the depression portion at the inner surface of the bottom surface of the case is within the depression portion at the outer surface of a cap assembly of the neighboring unit cell.

According to some embodiments, a center of the depression portion at the inner surface of the bottom surface of the case corresponds to a center of the depression portion at the outer surface of the cap assembly.

According to some embodiments, the depression portion at the outer surface is formed in plural at a set interval at the outer surface and has a rectangular shape extending along a short side direction of the outer surface.

According to some embodiments, the rectangular shape has a rounded edge.

According to some embodiments, the depression portion at the outer surface extends parallel to a long side direction of the outer surface at an equal interval.

According to some embodiments, a width of the depression portion at the outer surface is 1.5 times to 3 times the width of the depression portion at the inner surface.

According to some embodiments, the width of the depression portion at the inner surface is 1 mm to 10 mm.

According to some embodiments, a depth of the depression portion is 0.1 mm to 2 mm.

According to some embodiments, the depression portion at the outer surface is formed in plural at a set interval on the outer surface, and an outermost depression portion is spaced apart from an edge of the outer surface of the case by 0.5 mm to 5 mm.

According to some embodiments of the present invention, in a rechargeable battery module, even if a swelling phenomenon occurs in the unit cell during the process in which the charge and discharge are repeated, because the first buffer unit and the second buffer unit are included in the bottom surface of the case and the cap plate serving as the elastic member, excessive extension or swelling of the case may be reduced or prevented, such that the cycle-life of the rechargeable battery may be remarkably improved.

Also, the rechargeable battery module having the above-described structure according to some embodiments of the present invention may effectively protect the electrode assembly even if an external impact is transmitted to the case, thereby improving the impact resistance of the rechargeable battery module.

DETAILED DESCRIPTION

Figure 1:
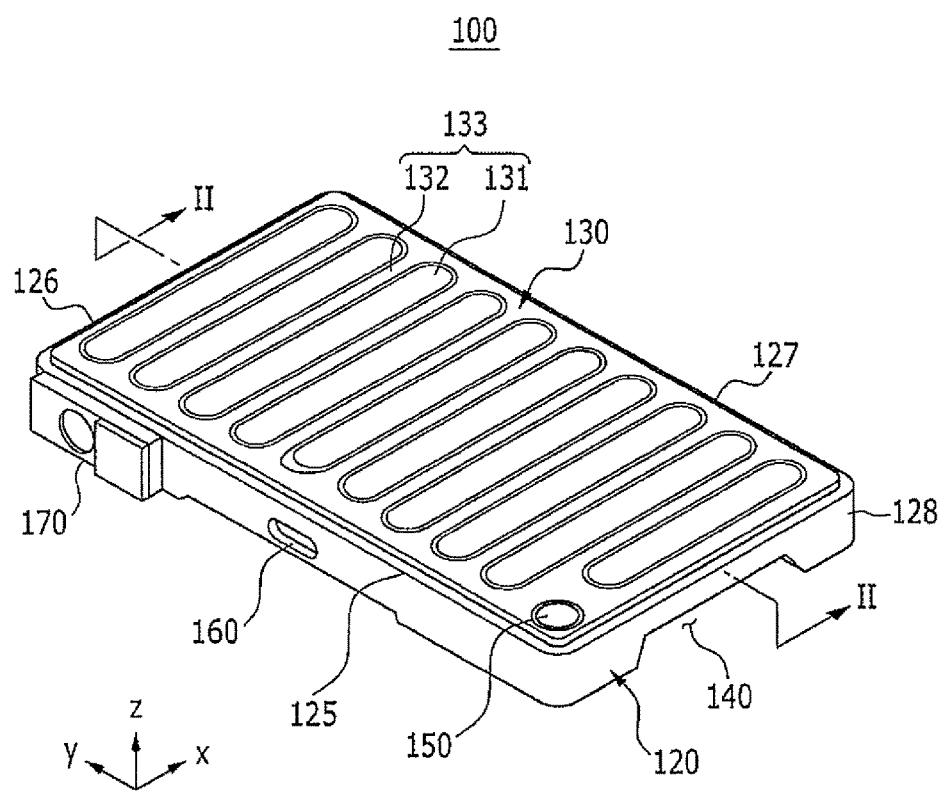
FIG. 1 shows a perspective view of a unit cell included in a rechargeable battery module according to some example embodiments of the present invention.

Aspects of embodiments of the present invention will be described more fully hereinafter with reference to the accompanying drawings, in which example embodiments of the disclosure are shown. As those skilled in the art would recognize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, the size and thickness of each configuration shown in the drawings may be exaggerated for better understanding and ease of description, but the present disclosure is not limited thereto.

In addition, unless explicitly described to the contrary, the word "comprise" and variations such as "comprises" or "comprising" will be understood to imply the inclusion of stated elements but not the exclusion of any other elements.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Figure 2:
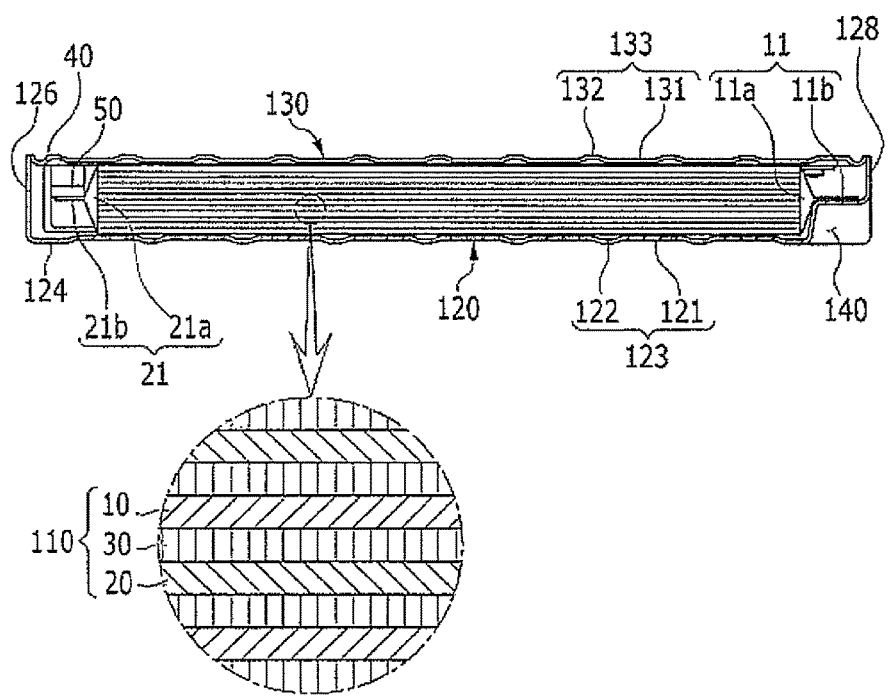
FIG. 2 shows a cross-sectional view taken along the line II-II of FIG. 1.
Figure 3:
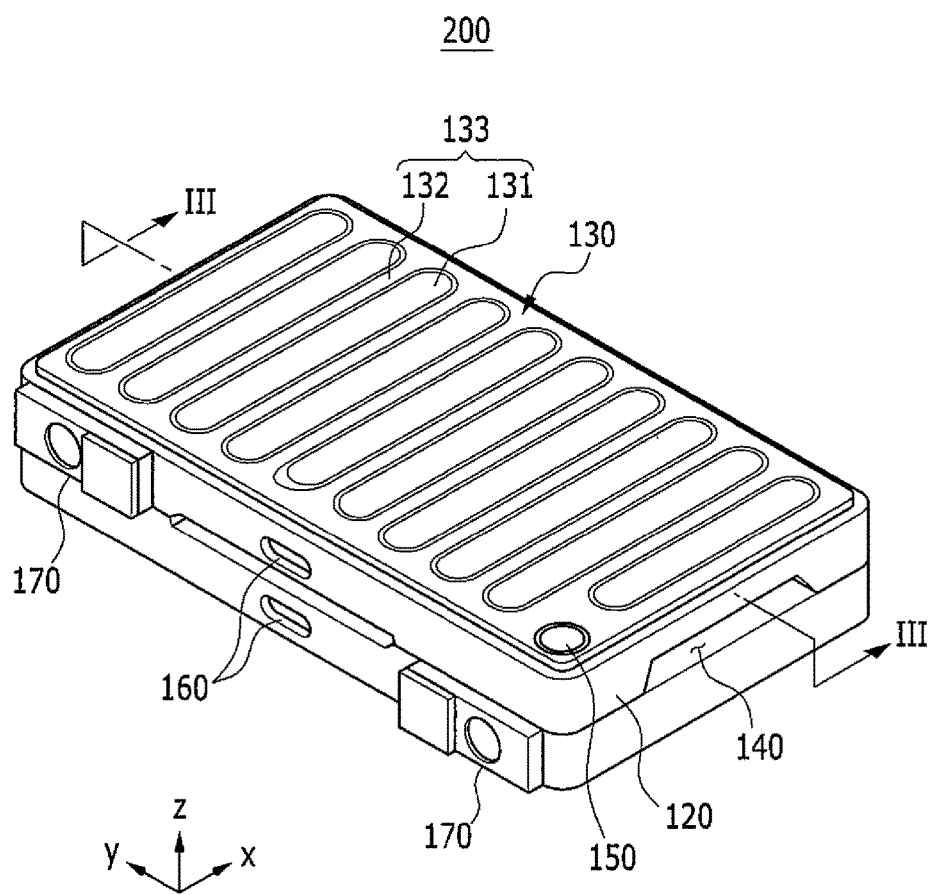
FIG. 3 shows a perspective view of a rechargeable battery module according to some example embodiments of the present invention.

FIG. 1 shows a perspective view of a unit cell included in a rechargeable battery module according to an example embodiment of the present invention, and FIG. 2 shows a cross-sectional view taken along the line II-II of FIG. 1. FIG. 3 shows a perspective view of a rechargeable battery module according to an example embodiment of the present invention, and FIG. 4 shows a cross-sectional view taken along the line of FIG. 3.

Figure 4:
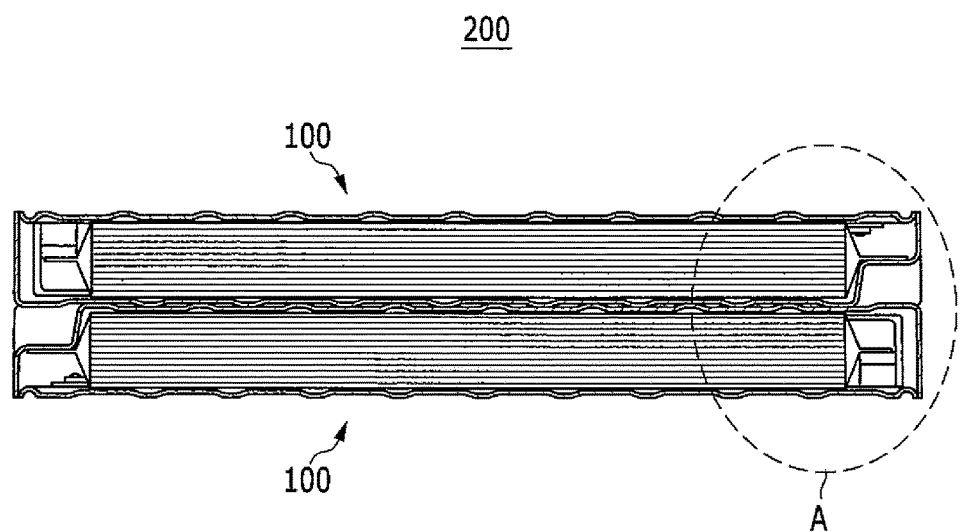
FIG. 4 shows a cross-sectional view taken along the line Ill-Ill of FIG. 3.

Referring to FIG. 3 and FIG. 4, a rechargeable battery module 200 according to an example embodiment includes a plurality of unit cells 100.

Hereafter, for better comprehension and ease of description, first, a configuration of each unit cell included in the rechargeable battery module of the present disclosure will be described.

Referring to FIG. 1 and FIG. 2, each unit cell 100 includes an electrode assembly 110, a case 120, and a cap plate 130. Hereinafter, a rectangular battery is illustrated, but the present invention is not limited thereto, and the present invention may be applied to any suitable rechargeable battery configuration such as a pouch battery and a lithium polymer battery.

First, the electrode assembly 110 configured to perform the charge and the discharge of the current includes a positive electrode 10, a negative electrode 20, and a separator 30 interposed therebetween. In this case, the positive electrode 10 and the negative electrode 20 are spirally wound in a jelly-roll shape after interposing the separator 30 as an insulator therebetween, and are pressed to be housed in the case 120, thereby being formed in a plate shape. However, the present invention is not limited thereto, and the electrode assembly 110 may be formed into a structure in which the positive electrode 10, the separator 30, and the negative electrode 20 are sequentially laminated so that the separator 30 is interposed between the positive electrode 10 and the negative electrode 20.

In this case, the positive electrode 10 includes a positive electrode coated portion that is formed in a long connected band shape and that is an area in which an active material is coated, and a positive electrode uncoated region 11 which is an area in which an active material is not coated. The positive electrode uncoated region 11 is located at an end portion of one side of a length direction of the positive electrode.

The negative electrode 20 includes a negative electrode coated portion that is formed in a long connected band shape and that is an area in which an active material is coated, and a negative electrode uncoated region 21, which is an area in which an active material is not coated. The negative electrode uncoated region 21 is located at an end portion of one side of a length direction of the negative electrode.

Additionally, the positive electrode uncoated region 11 is bonded to the case 120. Accordingly, in the present invention, the case 120 is charged with the positive electrode 10. Also, the negative electrode 20 is bonded with an electrode lead 50 via an insulator 40 by welding to be electrically connected to a negative terminal 170.

Accordingly, the positive electrode uncoated region 11 may be formed with an inclined connection portion 11a that is obliquely arranged with respect to an external circumferential surface of the electrode assembly 110, and a bonding portion 11b that is bent in the inclined connection portion 11a and is welded to the case 120. Also, the negative electrode uncoated region 21 may be formed with an inclined connection portion 21a that is obliquely arranged with respect to the external circumferential surface of the electrode assembly 110, and a bonding portion 21b that is bent in the inclined connection portion 21a and is bonded to the electrode lead 50 to be electrically connected to the negative terminal 170.

As described above, the plate type electrode assembly 110 including the positive electrode 10, the negative electrode 20, and the separator 30 interposed therebetween is received in the case 120 through the opening formed at one upper side. That is, the case 120 forms the entire exterior of the unit cell 100 and provides a space for receiving the electrode assembly 110 and the electrolyte solution therein. For this, the case 120 is formed in the shape of a plate-configuration cuboid having an opening formed in one side thereof. The material thereof may be a metal such as aluminum, an aluminum alloy, or stainless steel, but is not limited thereto.

Additionally, the opening of the case 120 is formed in a direction (e.g., a z-axis direction) crossing a plane (e.g., an xy plane) of the electrode assembly 110. For example, the opening of the case 120 is formed at the wide side surface among the six surfaces of the case 120, as shown in FIG. 1 and FIG. 2. Accordingly, the electrode assembly 110 may be inserted into the case 120 in the z-axis direction crossing the xy plane. As described above, because the electrode assembly 110 is inserted into the wide opening of the case 120, assembly work of inserting the electrode assembly 110 into the case 120 may be relatively easily performed.

Also, because the case 120 having the opening at the wide side may be relatively easily manufactured by a forming method, compared with a dip drawing method, for example, compared with the case 120 made with a shape that is long in the z-axis direction and having the opening at the narrow side, a defect rate generated in the manufacture process may be reduced.

Additionally, according to some embodiments of the present invention, the case 120 has a bottom surface of a rectangular shape supporting the plane surface of the electrode assembly 110 at the side opposite to the quadrangular opening and a side wall having a height (e.g., a predetermined height) along an outer circumference of the bottom surface. Here, the bottom surface is formed as a quadrangle corresponding to the plane surface of the electrode assembly 110, and the side wall corresponds to the height in the z-axis direction of the electrode assembly 110.

In this case, the side wall includes a pair of long side walls 125 and 127 parallel to each other and a pair of short side walls 126 and 128 crossing the long side walls 125 and 127 to be connected and parallel to each other. The side walls are formed along the outer circumference of the bottom surface of the rectangle shape. Accordingly, as shown in FIG. 1 and FIG. 2, the long side walls 125 and 127 may be formed to be relatively longer than the short side walls 126 and 128.

A flange 140 with a concave structure of a 3-D rectangle is formed at one end of the short side wall 128, thereby smoothly emitting heat when welding the case 120 and performing a function of improving the assembling performance of the unit cell 100 when configuring the rechargeable battery module.

Also, a terminal hole for installing the negative terminal 170 may be provided at one end of the long side wall 125. In this case, the negative terminal 170 is installed while penetrating the terminal hole, and the negative terminal 170 is electrically connected to the negative electrode 20 of the electrode assembly 110 received into the case 120.

A vent hole 160 may be provided at the long side wall 125 of the case 120 formed with the terminal hole. The vent hole 160 has a function to exhaust a gas generated inside the unit cell 100 and an internal pressure due to the gas caused by the charging and discharging operations of the electrode assembly 110. That is, if the internal pressure of the unit cell 100 reaches a pressure (e.g., a predetermined pressure), the vent hole 160 is opened to exhaust the gas and the internal pressure, thereby improving the safety of each unit cell 100.

The case 120 is electrically connected to the positive electrode 10 in the state that the electrode assembly 110 is received. For example, as described above, the bonding portion 11b of the positive electrode uncoated region 11 is welded to one end of the short side wall 128 of the case 120 to be electrically connected thereto. In this case, because one end of the short side wall 128 includes the flange, the cross-section thereof may be bent in a step shape and the surface parallel to the bonding portion 11b of the positive electrode uncoated region is connected by the welding such that the case 120 may be charged as the positive electrode 10.

Next, the cap plate 130 is installed to the opening of the case 120 to close and seal the case 120. In this instance, the cap plate 130 may be formed of the same electrically conductivity metal as the case 120 such as aluminum or an aluminum alloy, and is bonded to the case 120 by the welding and the like.

Accordingly, in the unit cell 100, the case 120 and the cap plate 130 may be charged as the positive electrode 10, and the case 120 may function as the positive electrode terminal.

The cap plate 130 may include an electrolyte injection opening 150. The electrolyte injection opening may facilitate injection of the electrolyte solution inside the case 120 after the cap plate 130 is coupled and welded to the case 120. After the electrolyte solution is injected, the electrolyte injection opening 150 is sealed by a sealing plug.

Next, as shown in FIG. 3 and FIG. 4, the rechargeable battery module according to an example embodiment of the present invention includes the plurality of unit cells 100 including the above-described configuration.

For example, in the rechargeable battery module of the present invention, the case 120 of each unit cell 100 may include a first buffer unit 123 at the inner surface and the outer surface of a bottom surface 124 thereof. The cap plate 130 may also include a second buffer unit 133 at the inner surface and the outer surface.

The first buffer unit 123 and/or the second buffer unit 133 may operate to reduce a force generated inside and/or outside of the unit cell 100. Accordingly, the unit cell 100 of the present invention may effectively reduce the generation of the swelling due to the pressure increase in the battery without a separate elastic member, and damage to the rechargeable battery due to an external impact may be prevented or reduced.

For example, the first buffer unit 123 and/or the second buffer unit 133 include the depression portion formed in the inner surface of the bottom surface of the case 120 and/or the outer surface of the cap plate 130 thereby reducing or preventing deformation of the unit cell 100 due to swelling or an external impact.

For example, the first buffer unit 123 and the second buffer unit 133 may include depression portions 121, 122, 131, and 132 formed in the bottom surface 124 of each case 120 and the outer surface and the inner surface of the cap plate 130.

For example, the depression portions 121 and 131 arranged in the bottom surface 124 of the case and/or the outer surface of the cap plate 130 may be formed in plural at an interval (e.g., a predetermined interval) to the bottom surface of the case 124 and/or the outer surface of the cap plate 130, and may have the rectangle shape extending along the short side direction of the outer surface. In this case, the depression portions 121 and 131 may have the rectangular shape in which one or more of the edges (e.g., the corners or the ends) are rounded in an aspect of ease of manufacturing.

Further, the depression portion 121 and 131 of the bottom surface 124 of the case and/or the outer surface of the cap plate 130 may be formed with the same interval and arranged in parallel along the long side direction of the outer surface, thereby forming a stripe shape.

However, in the present invention, the shape and the arrangement of the depression portions 121 and 131 may be varied, and are not limited thereto.

Figure 5:
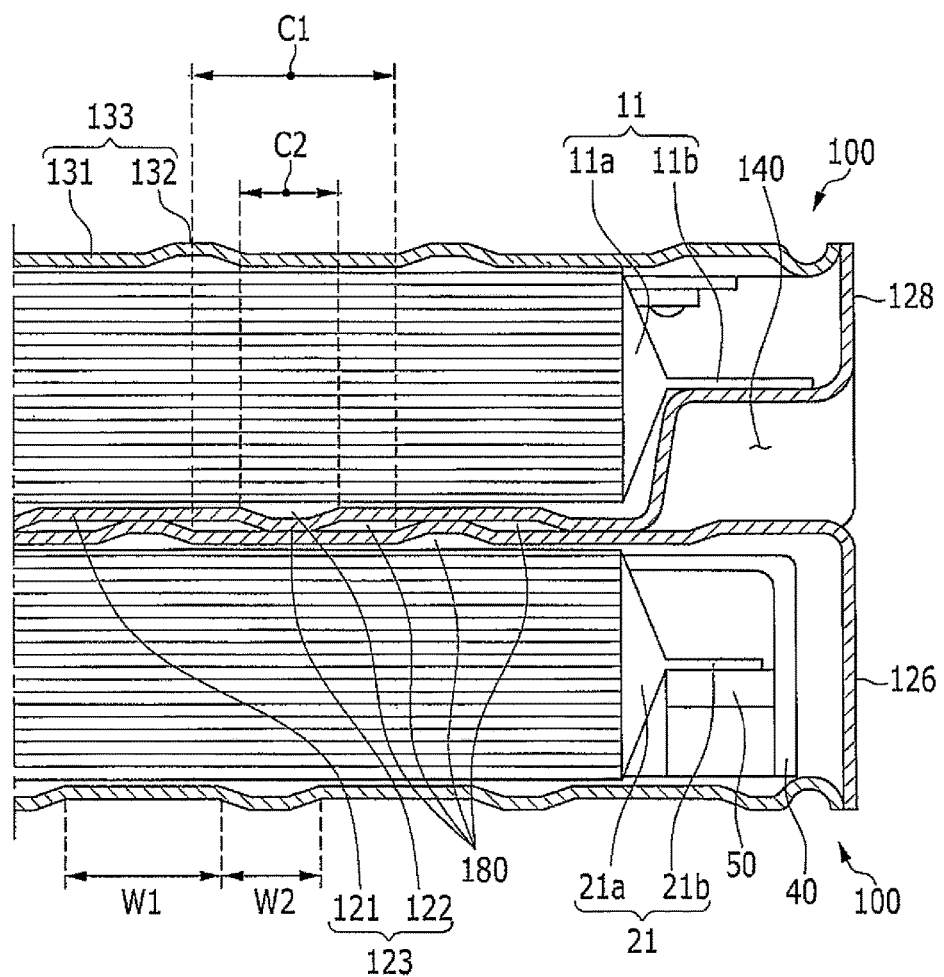
FIG. 5 shows an enlarged view of a portion of FIG. 4.

To facilitate understanding, FIG. 5 shows an enlarged view of a portion A of FIG. 4.

Referring to FIG. 5, the width W1 of the depression portions 121 and 131 of the bottom surface 124 of the case and/or the outer surface of the cap plate 130 may be 1.5 times to 3 times the width W2 of the depression portion 122 and 132 included in the bottom surface 124 of the case and/or the inner surface of the cap plate 130.

In this case, the width W2 of the depression portions 122 and 132 in the bottom surface 124 of the case and/or the inner surface of the cap plate 130 may be in a range of 1 mm to 10 mm, for example, but embodiments of the present invention are not limited thereto.

The width W1 of the depression portions 121 and 131 of the bottom surface 124 of the case and/or the outer surface of the cap plate 130, as shown in FIG. 5, indicates the shortest distance between the side walls of the depression portions 121 and 131 in the cross-section of the direction (the x-axis direction) in which the plurality of depression portions 121 and 131 are arranged in parallel.

Also, the width W2 of the depression portion 122 and 132 included in the bottom surface 124 of the case and/or the inner surface of the cap plate 130 indicates the longest distance between the side walls of the depression portions 122 and 132 in the cross-section of the direction (the x-axis direction) in which the plurality of depression portions 122 and 132 are arranged in parallel, as shown in FIG. 5.

According to some embodiments of the present invention, the width W1 of the depression portions 121 and 131 of the bottom surface 124 of the case and/or the outer surface of the cap plate 130 may be larger than the width W2 of the depression portions 122 and 132 of the inner surface and for the width W2 of the depression portions 122 and 132 of the inner surface to satisfy the above range. In this case, because an air passage due to the formation of the depression portions 121, 122, 131, and 132 may be formed with more volume while the battery capacity of the unit cell is not deteriorated, the effect of reducing the swelling phenomenon in each unit cell 100 may be increased (or maximized), and the impact resistance and the stability of the rechargeable battery module may be further improved.

Also, the depth of the depression portions 121, 122, 131, and 132 formed in the bottom surface 124 of the case and/or the inner surface and the outer surface of the cap plate 130 may be in a range of 0.1 mm to 2 mm. When the depth of the depression portions 121, 122, 131, and 132 is below 0.1 mm, the reduction of the swelling phenomenon in each unit cell 100 and the improvement of the impact resistance and the stability expected in the present disclosure may be relatively small, and when the depth of the depression portions 121, 122, 131, and 132 is over 2 mm, the battery capacity may be reduced. Thus, according to some embodiments of the present invention, the depth of the depression portions 121, 122, 131, and 132 may be within the above-described range.

The depth H of the depression portions 121, 122, 131, and 132 indicates, as shown in FIG. 5, the distance from the lowest point to the highest point of the depression portions 121, 122, 131, and 132 formed in the bottom surface 124 of the case and/or the inner surface and/or the outer surface of the cap plate 130.

Alternatively, the plurality of depression portions 121 and 131 of the outer surface may be formed with the interval in the bottom surface 124 of the case and/or the outer surface of the cap plate 130, and they may be formed to the outermost edge of the outer surface. However when considering a mold to form the depression portions 121 and 131 and convenience of the manufacturing process, according to some embodiments, the depression portions 121 and 131 may be formed from a position separated from the edge of the bottom surface 124 of the case and/or the outer surface of the cap plate 130 by a distance in a range of 0.5 mm to 5 mm.

The depression portions 121, 122, 131, and 132 may form the air passage. The air passage, as shown in FIG. 2, indicates the space generated in the process in which the depression portions 122, and 132 are formed in the inner surface of the bottom surface 124 of the case and/or the cap plate 130. Also, the air passage 180, as shown in FIG. 5, indicates the space formed in the process in which the depression portion 121 of the bottom surface 124 of the case of each unit cell 100 and the portion of the depression portion 131 of the cap plate 130 of the unit cell 100 adjacent thereto are arranged to be partially overlapped in the rechargeable battery module.

Next, the arrangement of each unit cell 100 and the neighboring unit cell 100 in the rechargeable battery module of the present invention will be described in more detail.

For each unit cell 100, the first buffer unit 123 may be arranged to partially overlap the second buffer unit 133 of the neighboring unit cell 100.

For example, the depression portion 121 formed in the outer surface of the bottom surface 124 of the case among the depression portions 121 and 122 formed in the first buffer unit 123 may be arranged to partially overlap the depression portion 131 formed in the outer surface of the cap plate 130 among the depression portions 131 and 132 formed in the second buffer unit 133 of the neighboring unit cell 100.

Also, the depression portion 122 formed in the inner surface 122 of the bottom surface of case 120 among the depression portions 121 and 122 formed in the first buffer unit 123 may be alternately formed without overlapping with the depression portion 132 formed in the inner surface of the cap plate 130 among the depression portion formed in the second buffer unit 133 of the neighboring unit cell 100.

Furthermore, for each unit cell 100 of the rechargeable battery module, the depression portion 122 formed at the inner surface of the bottom surface 124 of the case may be arranged in the depression portion 121 formed at the outer surface of the cap plate 130 of the neighboring unit cell 100.

In the rechargeable battery module of the present invention, by arranging the depression portions included in the first buffer unit 123 and the second buffer unit 133 as described above, the space forming the air passage 180 may be further increased. Also, as described above, if the space forming the air passage 180 is increased, the function as the elastic member may be effectively performed such that the swelling phenomenon may be reduced. Also, because the air passage 180 may increase (or maximize) the impact absorption function of the rechargeable battery module even against a relatively strong external impact, deformation of the case 120 may be reduced or prevented. Accordingly, the safety of the rechargeable battery may be relatively improved.

For example, according to some embodiments of the present invention, the depression portion center C2 formed in the inner surface of the bottom surface 124 of the case may be arranged to correspond to the depression portion center C1 formed in the outer surface of the cap plate 130. In the case of this arrangement, while the battery capacity is maintained with the high-capacity, the volume of the air passage 180 formed between the unit cells 100 forming the rechargeable battery module may be increased such that the swelling prevention, the impact resistance, and the stability improvement may be improved (or maximized) in the battery.

Figure 6:
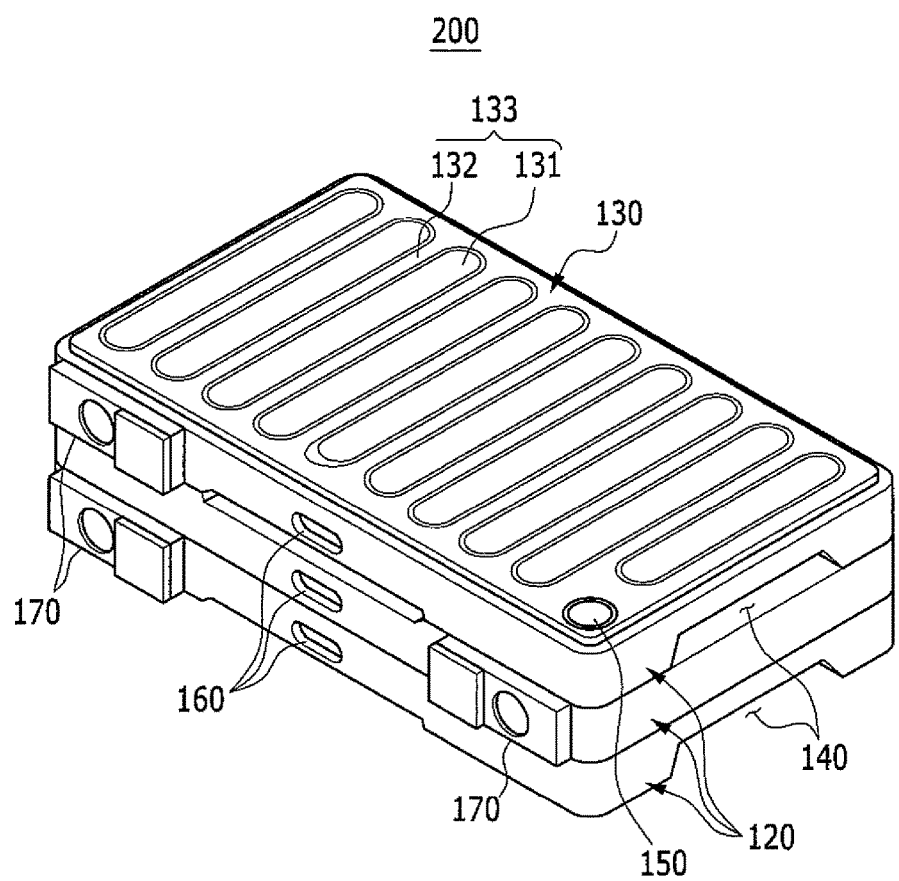
FIG. 6 shows a perspective view of a unit cell included in a rechargeable battery module according to some example embodiments of the present invention.

FIG. 6 is a perspective view of a rechargeable battery module according to another example embodiment.

According to some embodiments of the present invention, the rechargeable battery module may be configured by connecting two or more unit cells 100 as necessary, or as shown in FIG. 6, three or more unit cells 100. Accordingly, the number of unit cells 100 configuring the rechargeable battery module is not limited to the number illustrated.

As described above, the rechargeable battery module according to some embodiments of the present invention includes the first buffer unit and the second buffer unit in which the depression portions are formed in the bottom surface of the case and the inner surface and the outer surface of the cap plate. Because the buffer units may perform the function of the elastic member such as a spring, the rechargeable battery module according to an example embodiment may reduce or prevent excessive expansion of the case due to the swelling phenomenon such that the cycle-life of the battery may be effectively improved.

Also, even if the strong impact is transmitted inside and outside of the case, the buffer units may operate to absorb the impact such that the electrode assembly may be protected.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims, and their equivalents.

DESCRIPTION OF SOME OF THE SYMBOLS

10: positive electrode
11: positive electrode uncoated region
11a: inclined connection portion
11b: bonding portion
20: negative electrode
21: negative uncoated region
21a: inclined connection portion
21b: bonding portion
30: separator
40: insulator
50: electrode lead
100: unit cell
110: electrode assembly
120: case
121: depression portion of an outer surface of a case
122: depression portion of an inner surface of a case
123: first buffer unit
124: bottom surface of a case
125, 127: long side wall
126, 128: short side wall
130: cap plate
131: depression portion of an outer surface of a cap plate
132: depression portion of an inner surface of a cap plate
133: second buffer unit
140: flange
150: electrolyte injection opening
160: vent hole
170: negative terminal
180: air passage
W1: width of a depression portion of an outer surface
W2: width of a depression portion of an inner surface
H: depth of a depression portion
C1: center of a depression portion of an outer surface
C2: center of a depression portion of an inner surface

What is claimed is:

1. A rechargeable battery module comprising a plurality of unit cells,
wherein each of the unit cells comprises:
an electrode assembly having a plate shape;
a case receiving the electrode assembly and having an opening at one side opposite a bottom of the case; and
a cap assembly sealing the opening of the case,
wherein the case comprises a first arrangement of buffer units configured to reduce a force generated inside or outside the case on an inner surface and an outer surface of the bottom of the case,
the cap assembly is plate shaped and comprises a second arrangement of buffer units, the second arrangement of buffer units being different from the first arrangement of buffer units and configured to reduce a force generated inside or outside the case on an inner surface and an outer surface of the cap assembly, and
wherein the first arrangement of buffer units is the same for a first unit cell and a second unit cell of the unit cells, and the second arrangement of buffer units is the same for the first unit cell and the second unit cell of the unit cells,
wherein a center of a depression portion at an inner surface of a bottom of the case of a first unit cell, from among the plurality of unit cells, is aligned with a center of a depression portion at an outer surface of a bottom of the case of a second unit cell, from among the plurality of unit cells, with the bottom of the case of the first unit cell facing toward the bottom of the case of the second unit cell such that a surface of the first unit cell having the first arrangement of buffer units and a surface of the second unit cell having the first arrangement of buffer units are oriented in opposite directions,
the depression portion at the outer surface of the bottom of the case of the second unit cell has a width greater than a width of the depression portion at the inner surface of the bottom of the case of the first unit cell, such that an air passage is formed between the first unit cell and the second unit cell within the depression portion at the outer surface of the bottom of the case of the second unit cell, and
a plurality of depression portions at the inner surface of the bottom of the case of the first unit cell are arranged along a first direction and continuously extend in a second direction.

2. The rechargeable battery module of claim 1, wherein for each unit cell, each of the buffer units of the first and second arrangements of buffer units comprise a depression portion at the inner surface and the outer surface of the bottom of the case and a depression portion at the inner surface and the outer surface of the cap assembly, respectively.

3. The rechargeable battery module of claim 2, wherein the depression portion at the inner surface of the bottom of the case and the depression portion at the inner surface of the cap assembly form air passages between the bottom of the case and the electrode assembly, and the cap assembly and the electrode assembly, respectively.

4. The rechargeable battery module of claim 2, wherein for each unit cell, the depression portion at the outer surface of the bottom of the case partially overlaps the depression portion at the inner surface of the bottom of the case of a neighboring unit cell.

5. The rechargeable battery module of claim 2, wherein for each unit cell, the depression portion at the inner surface of the bottom of the case alternates with the depression portion at the inner surface of the bottom of the case of a neighboring unit cell without overlapping.

6. The rechargeable battery module of claim 2, wherein for each unit cell, the depression portion at the inner surface of the bottom of the case is within the depression portion at the outer surface of the bottom of the case of a neighboring unit cell.

7. The rechargeable battery module of claim 6, wherein for each unit cell, a center of the depression portion at the inner surface of the bottom of the case corresponds to a center of the depression portion at the outer surface of a bottom of the case of a neighboring unit cell.

8. The rechargeable battery module of claim 2, wherein the depression portion at the outer surface of the bottom of the case and the depression portion at the outer surface of the cap assembly are formed in plural at a set interval respectively, and have a rectangular shape extending along a short side direction of the outer surface of the bottom of the case and a short side direction of the outer surface of the cap assembly, respectively.

9. The rechargeable battery module of claim 8, wherein the rectangular shape has a rounded edge.

10. The rechargeable battery module of claim 8, wherein the depression portion at the outer surface of the bottom of the case and the depression portion at the outer surface of the cap assembly are formed with an equal interval, and are arranged in parallel along a long side direction of the outer surface of the bottom of the case and a long side direction of the outer surface of the cap assembly, respectively.

11. The rechargeable battery module of claim 8, wherein a width of the depression portion at the outer surface of the bottom of the case is 1.5 times to 3 times the width of the depression portion at the inner surface of the bottom of the case, and a width of the depression portion in the outer surface of the cap assembly is 1.5 to 3 times the width of the depression portion in the inner surface of the cap assembly.

12. The rechargeable battery module of claim 11, wherein each of the width of the depression portion at the inner surface of the bottom of the case and the width of the depression portion at the inner surface of the cap assembly is 1 mm to 10 mm.

13. The rechargeable battery module of claim 2, wherein each of a depth of the depression portion at the outer surface and the inner surface of the bottom of the case and a depth of the depression portion at the outer surface and the inner surface of the cap assembly is 0.1 mm to 2 mm.

14. The rechargeable battery module of claim 2, wherein the depression portion at the outer surface of the bottom of the case and the depression portion in the outer surface of the cap assembly are formed in plural at a set interval respectively, on the outer surface, and an outermost depression portion at the outer surface of the bottom of the case is spaced apart from an edge of the outer surface of the bottom of the case by 0.5 mm to 5 mm.

* * * * *